United States Patent [19]
Adell

[11] Patent Number: 5,473,306
[45] Date of Patent: Dec. 5, 1995

[54] MOTOR VEHICLE LIGHTING SYSTEM

[76] Inventor: Robert Adell, 31800 S. Brandingham, Franklin, Mich. 48025

[21] Appl. No.: 327,613

[22] Filed: Oct. 24, 1994

[51] Int. Cl.⁶ .................................................. B60Q 1/26
[52] U.S. Cl. .................. 340/468; 340/469; 340/457.2; 340/456; 307/10.8; 315/82
[58] Field of Search .......................... 340/468, 457, 340/457.2, 456, 469; 307/10.1, 10.3, 10.6, 10.8; 315/82, 83, 80, DIG. 4, 362, 315; 364/424.05

[56] References Cited

U.S. PATENT DOCUMENTS

| | | | |
|---|---|---|---|
| 3,774,071 | 11/1973 | Goodrich | 315/82 |
| 3,832,597 | 8/1974 | Mitchell | 315/82 |
| 4,667,129 | 5/1987 | Papillon | 315/82 |
| 4,684,819 | 8/1987 | Haag et al. | 315/82 |

Primary Examiner—Donnie L. Crosland
Attorney, Agent, or Firm—Alex Rhodes

[57] ABSTRACT

A motor vehicle lighting system for automatically turning headlights on when a transmission is shifted from neutral or park to forward or reverse, reducing electrical loads on batteries during vehicle start-ups and automatically resetting headlights from high beam to low beam. The lighting system also includes indicators to remind drivers, while driving, that their headlight high beams, turn signals or emergency signals are turned on. The lighting system is comprised of an electronic control unit and a reset circuit. The electronic control unit receives signals from the vehicle's ignition switch and a transmission gear sensing device to control the flow of current to the exterior lighting systems. The reset circuit latches when the headlights are switched to high beam and unlatches to switch the circuits back to low beam when the vehicle is stopped and the ignition switch is turned off.

20 Claims, 10 Drawing Sheets

MOTOR VEHICLE LIGHTING SYSTEM

FIELD OF THE INVENTION

This invention relates to vehicle lighting systems, and more particularly to a motor vehicle lighting system with automatic controls for operating headlights and reminding drivers to turn off their high beams, turn signals and emergency signals.

BACKGROUND OF THE INVENTION

Although current vehicle lighting systems have many advantages over earlier systems, they also have created needs which remain unsatisfied.

One problem with current vehicles is that drivers forget to dim their vehicles' bright headlights. Current vehicles have non-flashing low intensity indicator lights to inform drivers their high beams are turned on. The indicator lights are ineffective because their intensities are low and they are positioned outside of a driver's immediate field of vision. Moreover, they are sometimes obscured by objects such as steering wheels. Bright vehicle headlights greatly annoy other drivers and have caused head-on collisions and severe injury accidents.

In Adell U.S. Pat. No. 5,280,269, an indicator system is disclosed for reminding a driver that his bright lights are turned on. A flashing light and audible signal are activated to remind the driver that his high beams are turned on. When headlights are switched from high to low beam or turned off, the flashing light and audible signal are deactivated.

In Adell U.S. Pat. Nos. 5,113,175; 5,119,067; 5,212,468; 5,237,306 and 5,347,261, vehicle signalling systems are disclosed for requesting drivers of vehicles whose bright lights are turned on to dim the bright lights. Signalling lights are provided for signalling oncoming vehicles and vehicles behind the signalling vehicle to turn off their vehicle's bright lights. Narrow high intensity flashing beams are transmitted forwardly and rearwardly to signal other drivers.

Another problem with current vehicles is that some drivers forget to turn off headlights before leaving their vehicles, particularly when headlights are turned on before sunrise and vehicles are parked after sunrise when headlight beams are not visible. Although current vehicles have buzzers to warn drivers leaving vehicles that their headlights are on, this problem still exists.

Another problem is that some drivers neglect to turn on headlights or drive with only parking lights under conditions of poor visibility, such as rain and fog.

Another problem with current vehicles is that electrical systems allow drivers to start vehicles and stand with headlights and other accessories operating. This reduces the available battery power and if batteries are weak, the headlights and accessories can cause slow cranking and affect starting, especially during cold weather. This problem is anticipated to increase when a recently enacted federal rule, requiring headlights to be on at all times, takes effect.

At low temperatures, the chemical action inside the battery slows down. A cold battery will not produce as much current as a warm battery. Also, cold oil is very thick and the cold battery must supply more current to overcome friction and circulate the oil.

Moreover, automobile manufacturers have major programs to develop battery and hybrid powered vehicles because of government mandated pollution requirements. In electric and hybrid powered vehicles, battery condition affects vehicle acceleration and miles between battery charges. Conserving battery power will be important for gaining public acceptance. Electric vehicle controls will have to prioritize the use of headlights and accessories to maintain vehicle performance and maximize driving miles between battery charges.

Another problem with current vehicles is drivers drive for many miles with turn signals flashing, causing annoyance to other drivers and interfering with a smooth flow of traffic, particularly after making lane changes and entering and leaving expressways. This happens because turn signals do not self cancel after small rotations of steering wheels.

Although current vehicles include turn signal indicator lights, the lights are generally outside a driver's forward field of vision and the sounds of turn signal flasher units are not discernible from vehicle engine noise, radios, and road noises.

Still yet another problem with current vehicles is that drivers accidently turn on emergency flashing lights or neglect to turn them off. This also causes annoyance to other drivers and interferes with a smooth flow of traffic.

SUMMARY OF THE INVENTION

The present invention is a lighting system for passenger vehicles, motorcycles, trucks and off the road vehicles, licensed and unlicensed. The invention provides an automatic means for operating exterior lights, reduces the excessive use of bright headlights, turn signal lights and emergency signal lights; and reduces the drain on batteries during vehicle start-ups.

Headlights and taillights automatically turn on after a driver starts an engine and shifts a transmission into forward or reverse gear. Headlights and taillights automatically turn off and high beams automatically reset to low beams when a vehicle is stopped and an ignition switch is turned off.

If a driver neglects to cancel his vehicle's high beams, turn signal lights or emergency signal lights, after a delay, flashing lights and audible signals automatically activate to remind him to cancel these lights. Another feature is that headlight high beams automatically reset to low beams when a vehicle's ignition switch is moved from an "on" position to an "off" position.

The invention resides in certain controls and indicators which individually and collectively contribute to its ability to automatically activate and de-activate headlights and taillights; reduce electrical loads on vehicle batteries during vehicle start-ups; automatically reset high beams to low beams, and remind drivers that their high beams, turn signals and emergency signals are turned on.

During the starting of a vehicle, in neutral or park, the headlights and taillights are inactive. After the vehicle is started, the headlights and taillights are activated by shifting the vehicle's transmission into forward or reverse gear. A manual override switch is provided to permit a driver to operate the headlights and taillights when the transmission is in neutral or park, by way of example, during a warming up of an engine, heater and/or defroster.

Two embodiments are described for operating the manual headlight switch. In one embodiment, the manual headlight can only override the automatic controls and activate the headlights when the transmission is in neutral or park. In the second embodiment, the manual switch can override the automatic controls and activate the headlights when the transmission is in neutral, park, forward or reverse gear.

In another embodiment of the invention, the headlights and taillights are automatically activated by an electric speedometer system when the vehicle is set in motion and de-activated when the vehicle is stopped and the ignition switch is moved from an "on" position to an "off" position.

Other lights which currently can be operated with the ignition off, such as, a keyless entry, a remotely operated door lock, an electric door lock, interior lights, engine compartment lights and luggage compartment lights can continue to operate in the same manner.

Further benefits, features and objects of the invention will be apparent from the ensuing description of the invention and accompanying drawings which describe the invention in detail. A preferred embodiment is disclosed in accordance with the best mode which is contemplated in practicing the invention, and the subject matter in which exclusive property rights are claimed is set forth in each of the numbered claims at the conclusion of the detailed description.

BRIEF DESCRIPTION OF THE DRAWINGS

FIG. 2 is a diagram similar to FIG. 1 showing the headlights and taillights automatically turned on.

FIG. 4 is a diagram similar to FIG. 1 showing the parking lights turned on.

FIG. 5 is a diagram of a vehicle sub-system, according to the present invention, for reminding a driver that his headlight high beams, turn signal lights or emergency signal lights are turned on.

FIG. 6 is a diagram similar to FIG. 5 of an alternate embodiment for reminding a driver that his headlight high beams, turn signals or emergency signals are turned on.

FIG. 7 is a diagram of the high beam indicator portion of the sub-system for reminding a driver that his headlight's high beams are turned on.

DETAILED DESCRIPTION OF THE PREFERRED EMBODIMENT

Figure 1:
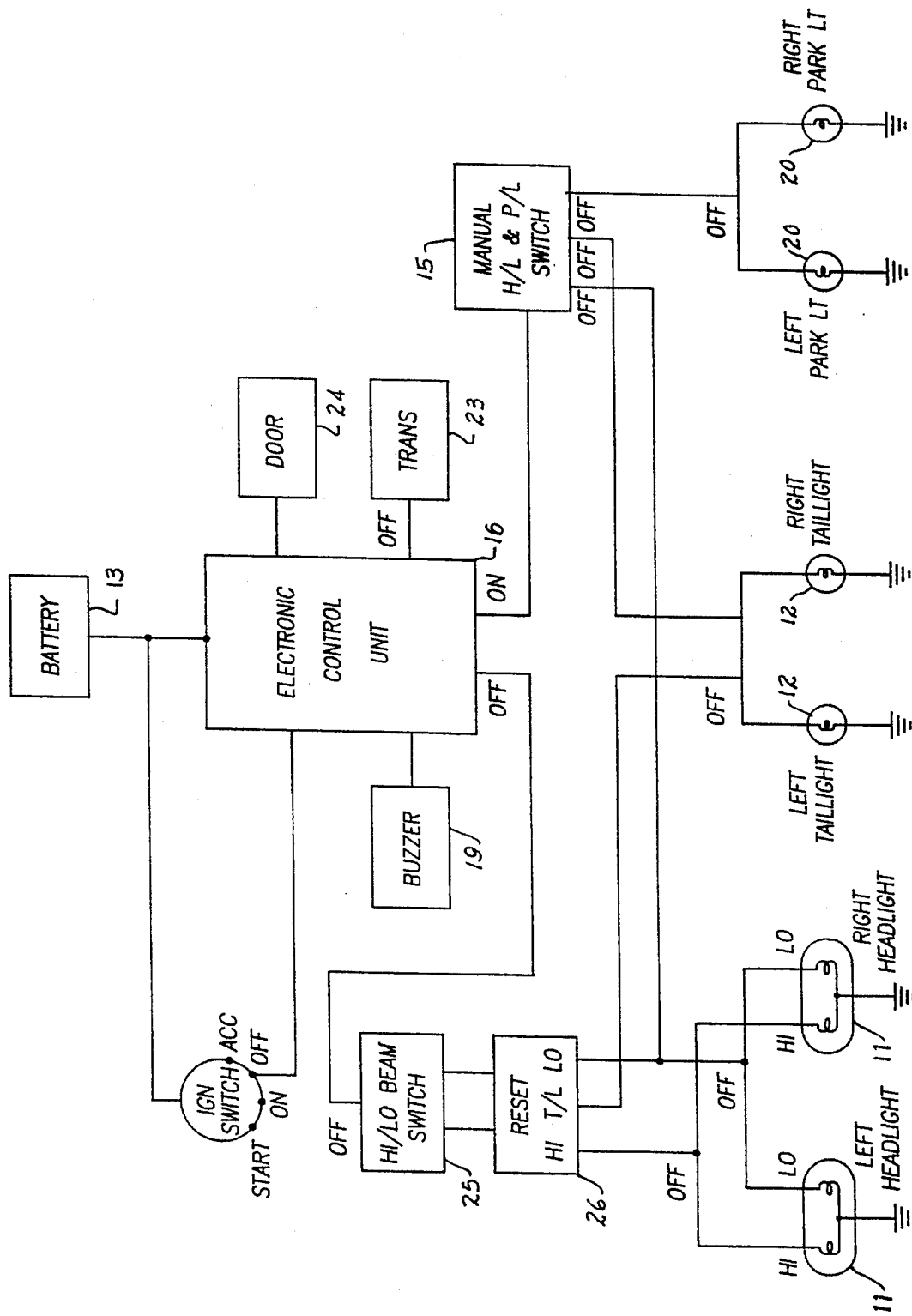
FIG. 1 is a diagram of a motor vehicle headlight sub-system with headlights and taillights turned off according to the present invention.

Referring now to the drawings wherein like numerals designate like and corresponding parts, a vehicle lighting system is shown according to the present invention.

The present invention operates as follows. When a driver starts the vehicle, the headlights 11 and taillights 12 are inoperative. This prevents the driver from increasing the electrical load on the vehicle's battery 13 by turning on the headlights 11 and taillights 12. After the vehicle's transmission is shifted into a forward or reverse gear, the headlight low beams automatically turn on.

While the vehicle is being driven, if a driver activates and neglects to turn off his high beams, turn signals, or emergency signals, after a delay, a flashing light and audible signal activate to remind the driver to turn off these lights.

When the driver stops the vehicle, shifts the transmission to park or neutral, and turns the ignition switch 14 off, the headlights 11 automatically turn off. If the headlight high beams are active when the vehicle is stopped, the transmission is shifted to neutral or park, and the ignition switch 14 is turned off, the high beam circuit automatically resets to low beams.

Another benefit is that vehicles cannot be driven during conditions of low visibility with only the parking lights turned on.

Thus, with the present invention, vehicles will not be operated with only parking lights 20 during conditions of low visibility or without headlights 11 turned on; the excessive use of headlight high beams, turn signals 21 and emergency signals 22 will be reduced and headlights 11 will not be left on when drivers leave their vehicles. Also, traffic interruptions and driver annoyances, due to the excessive use of high beams 11, turn signals 21 and emergency signals 22 will be reduced.

Figure 5:
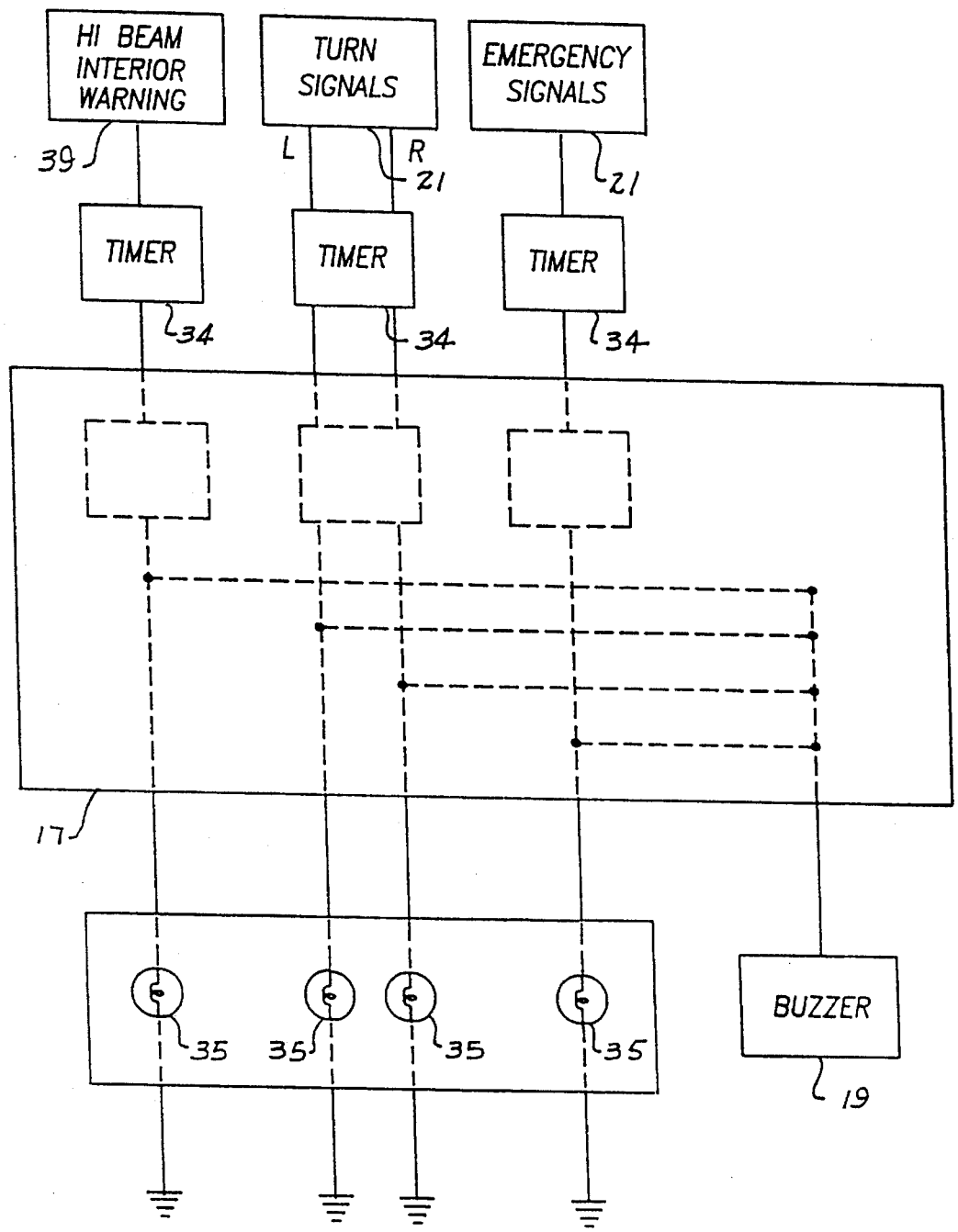

Referring now to FIGS. 1 and 5, the system for controlling exterior lights is comprised of a battery 13, an ignition switch 14, a manual headlight/parking light switch 15, a headlight electronic control unit (ECU) 16, an indicator electronic control unit 17, indicator lights 18, an audio generator (buzzer) 19, headlights 11, taillights 12, parking lights 20, turn signal lights 21, and emergency signal lights 22. The lighting system may also have other usual lights, such as side marker lights, turning lights.

In FIGS. 1–4, schematic diagrams are shown for the exterior lights in different operating modes. The electronic control unit (ECU) 16 is in series with the battery 13. The ECU 16 has an input side and in series with the battery 13, the ignition switch 14, a transmission gear sensing device 23, and a door position sensing device 24.

The transmission gear sensing device 23 may be any of the well known switches of the type used for sensing a transmission gear engagement, by way of example, switches which allow vehicles to be started in neutral and park and prohibit starting in forward and reverse gears. These switches have been located on steering columns, transmission, and floor mounted transmission shift devices.

The transmission gear sensing switch 23 is open in neutral and park for automatic transmission vehicles and open only in neutral for manual transmission vehicles. When a transmission is in a forward or reverse gear, the switch is closed and a voltage is applied to the input side of the ECU 16. The door sensing switch 24 is the usual type switch for activating an audible signal when a driver leaves his vehicle with headlights 11 turned on.

Other devices which are suitable for preventing operation of headlights 11 and taillights 12 during vehicle start-ups include electric speedometer systems.

The ECU 16 is comprised of relays or solid state devices for controlling the flow of current from the battery 13 to the headlights 11, taillights 12, indicator lights 18 and buzzer 19. It includes conventional digital gating circuits and/or relay circuits for regulating the flow of current. Typical digital gating circuits are disclosed in my U.S. Pat. No. 5,280,269.

The ignition switch 14 is a conventional rotary switch and includes a "start", ignition "on", ignition "off", and accessory position. When the ignition switch 14 is at the "start" position, current from the battery 13 is supplied to an engine starter and ignition system to start the vehicle's engine. In the "on" position, battery current is supplied to the ignition system and the ECU 16. However, current is not supplied by the ECU 16 to the headlights 11 or taillights 12 until the transmission gear sensing switch 23 closes when the transmission is shifted out of neutral or park into a forward or reverse gear.

In FIG. 1, the exterior light sub-system is shown with the headlights 11 and the taillights 12 turned off. As used herein, the word "on" indicates voltage and word "off" indicates zero voltage. Current is not supplied by the ECU 16 to the headlights 11 because the ignition switch 14 is at the "off" position and/or the transmission is in neutral or park.

Figure 2:
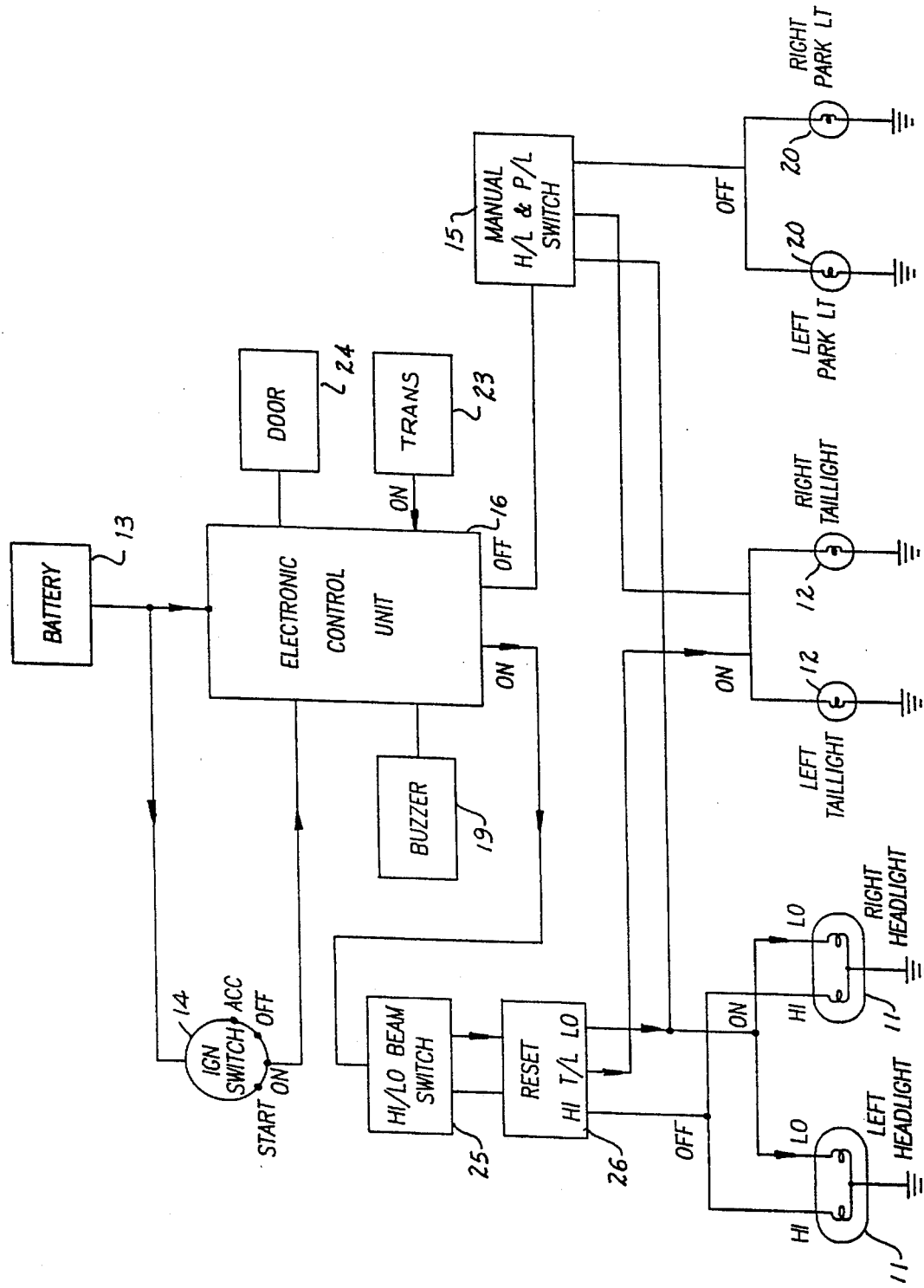

In FIG. 2, the exterior light sub-system is shown with the headlight 11 low beams and taillights 12 turned on. The ignition switch 14 is at the "on" position and the transmission has been shifted out of neutral or park into a forward or reverse gear. Current is supplied to the headlight 11 low beams via the ECU 16, HI/LO switch 25 and reset control 26. When the vehicle is stopped and the transmission is shifted to neutral or park, the headlights stay on until the ignition switch 14 is moved to the "off" position and the headlights 11 automatically turn off.

Figure 3:
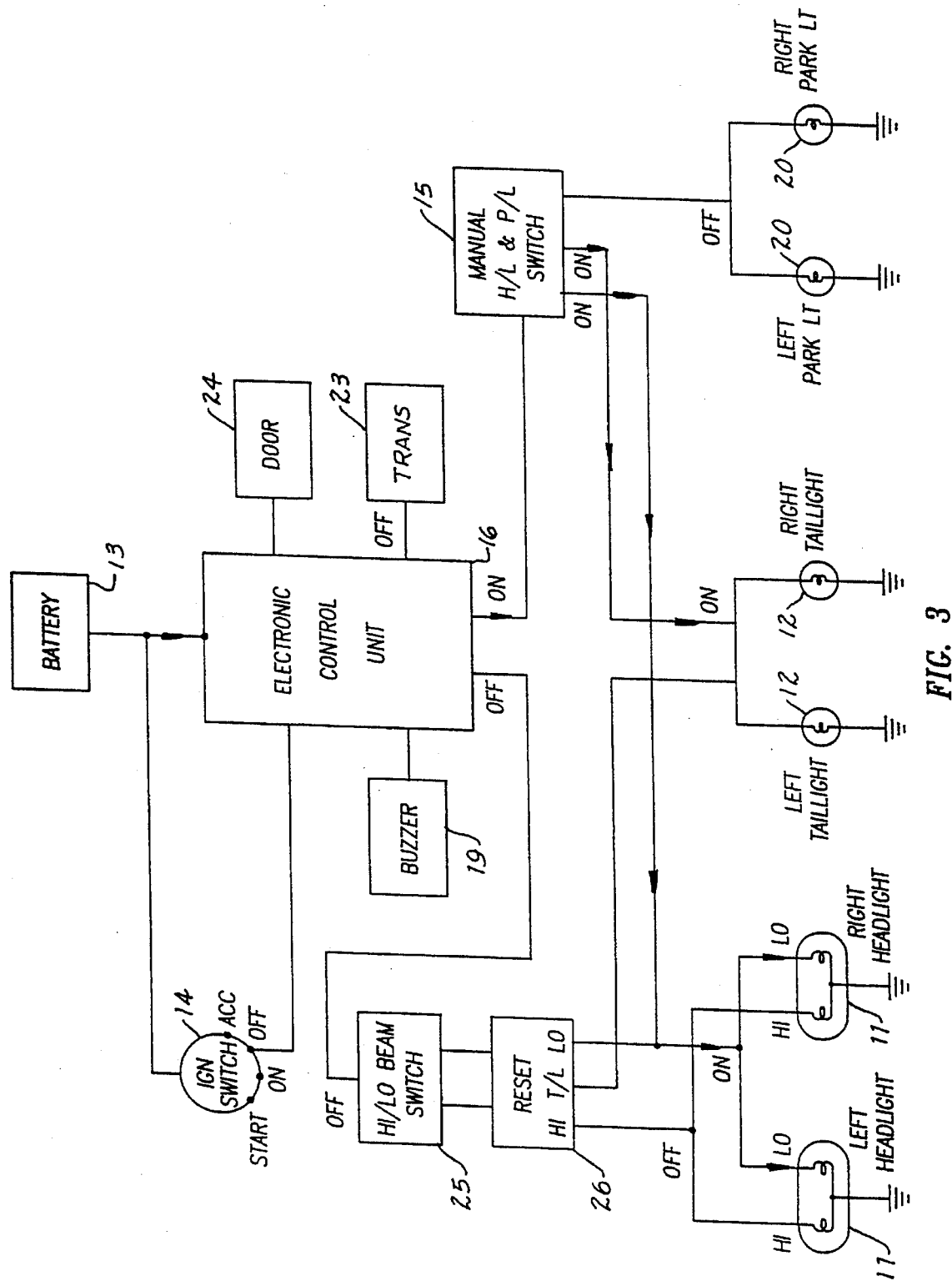
FIG. 3 is a diagram similar to FIG. 1 showing the headlights and taillights turned on with a manual switch.

In FIG. 3, the exterior light sub-system is shown with the headlight 11 low beams and taillights 12 turned on by the manual switch 15. In FIG. 3, the manual switch 15 is operable only when the transmission is in neutral or park (i.e., the transmission switch 23 is open). The ignition switch 14 may be at the "on" or "off" positions. Current is supplied to the headlight 11 low beams via the ECU 16 and manual switch 15.

Figure 4:
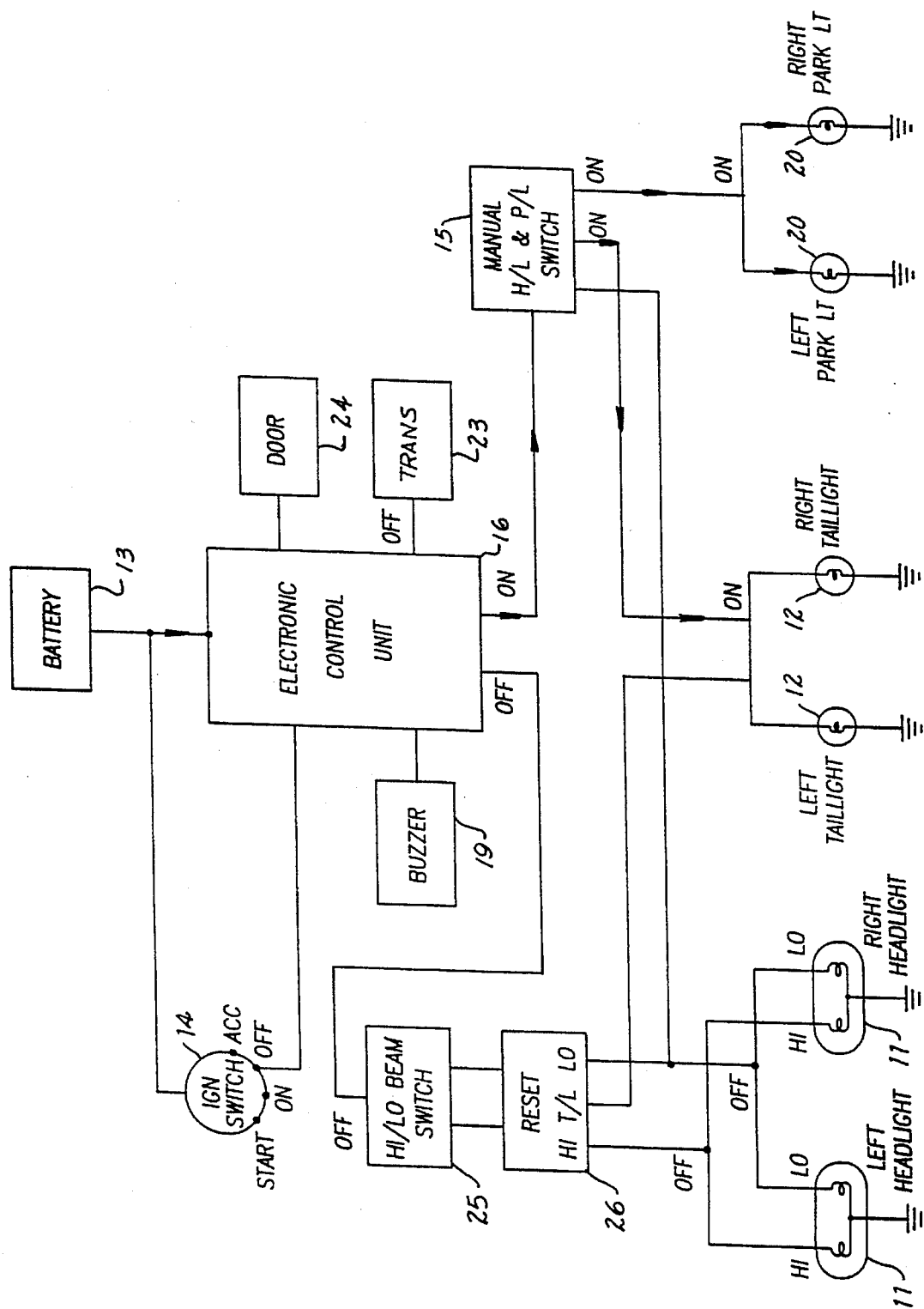

In FIG. 4, the exterior light sub-system is shown with the parking lights 20 and taillights 12 turned on by the manual switch 15. The ignition switch 14 is "on" or "off" and the transmission is at the neutral or park position. Current is supplied to the parking lights 20 via the ECU 16 and manual switch 15.

If the driver's door is opened and the ignition switch 14 is "on", the ECU 16 causes the indicator light 18 to flash and the buzzer 19 to buzz. If the door is opened and the headlights 11 are on by the manual headlight switch 15, the ECU 16 causes the indicator light 18 to flash and the buzzer 19 to buzz.

Figure 6:
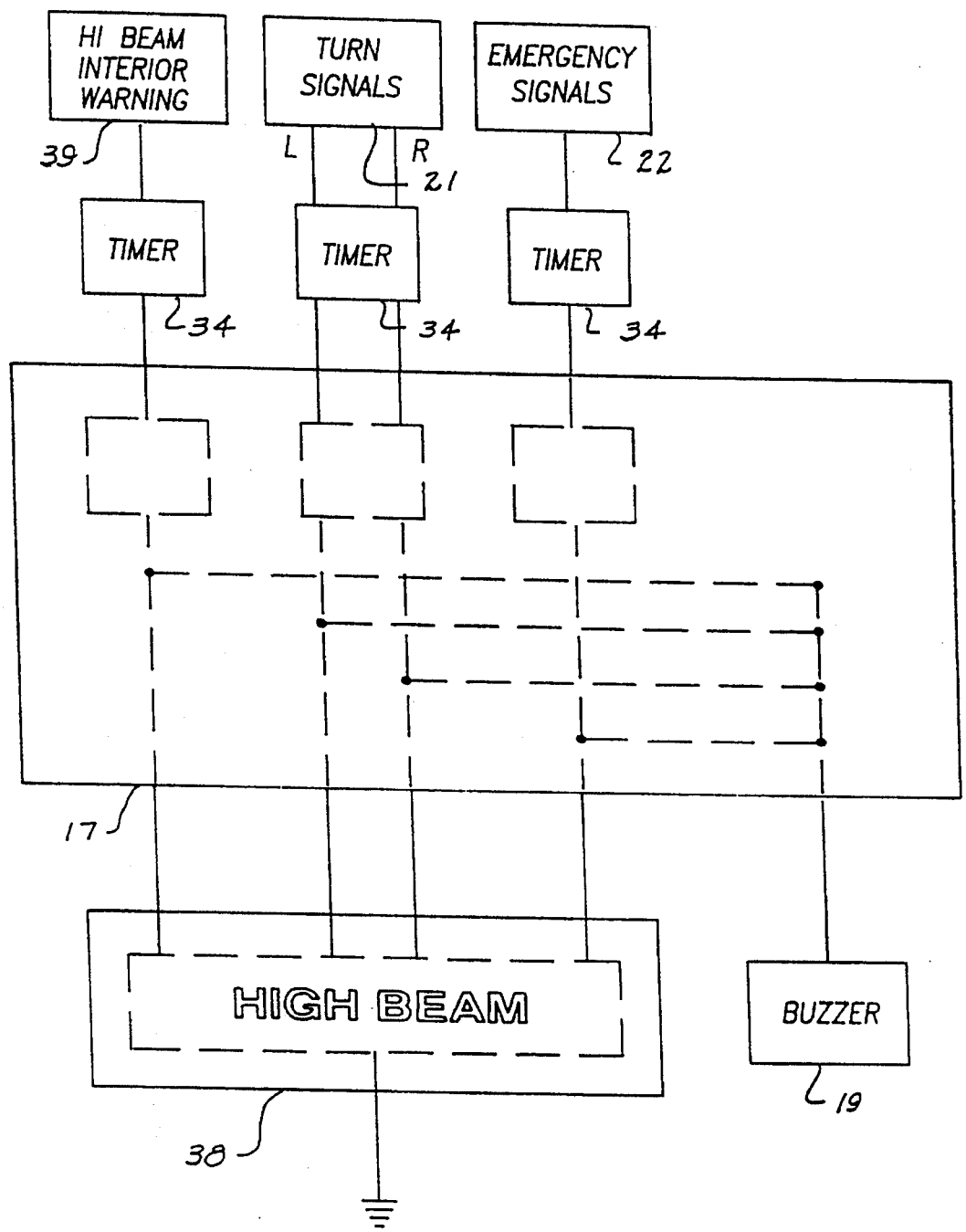
Figure 7:
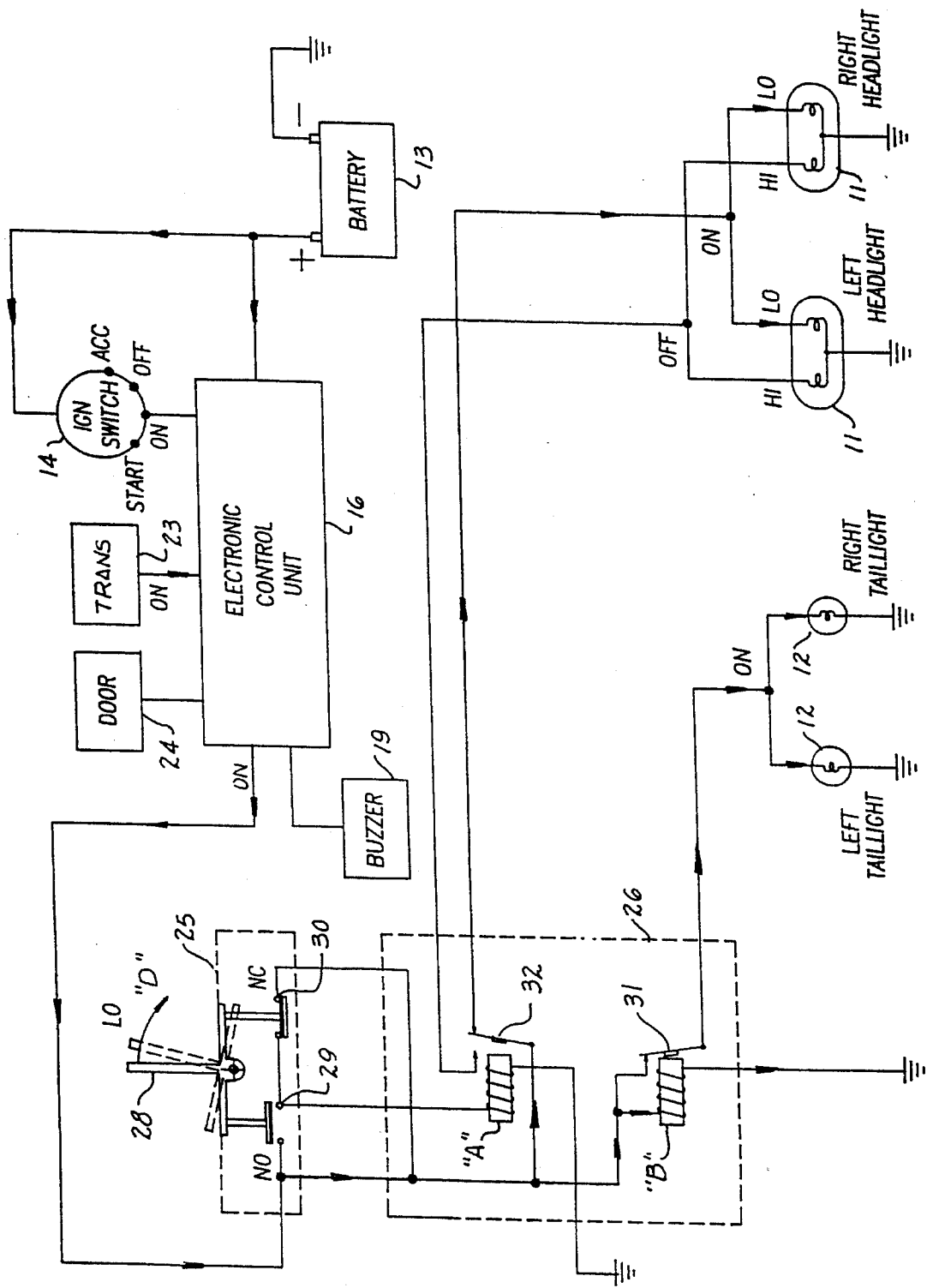

With reference to FIGS. 5–7, an indicator system is shown for reminding a driver that his headlight 11 high beams, turn signals 21 and emergency signals 22 are turned on. Referring to FIG. 5, the indicator system is shown comprised of electronic control units 17, timers 34, indicator lights 18 and buzzer 19.

When the headlight 11 high beams, turn signals 21 or emergency signals 22 are turned on, after a delay, timers 34 cause corresponding lights 18 to flash and buzzer 19 to generate audible signals. In FIG. 6, an embodiment is shown wherein a flashing illuminated message center is substituted for the separate flashing indicator lights 18 to designate the active lighting system or systems.

In FIG. 7, a high beam indicator system, based on Adell U.S. Pat. No. 5,280,269, is shown and is incorporated herein by reference. A flashing light 18 and buzzer 19 are automatically activated when the headlight 11 high beams are turned on and automatically de-activated when the headlights 11 are switched to the low beam operating mode or turned off.

A driver adjustable timer 39 has been added to permit a driver to delay the activation of the light 18 and buzzer 19 in accordance with his driving style and road conditions. The flashing light 18 can be switched to a non-flashing operating mode and the buzzer 19 de-activated separately with a driver control. If the headlights 11 are turned off in the high beam operating mode, the high beam indicator system automatically resets itself regardless of whether the indicator system has been de-activated with the driver control.

Figure 8:
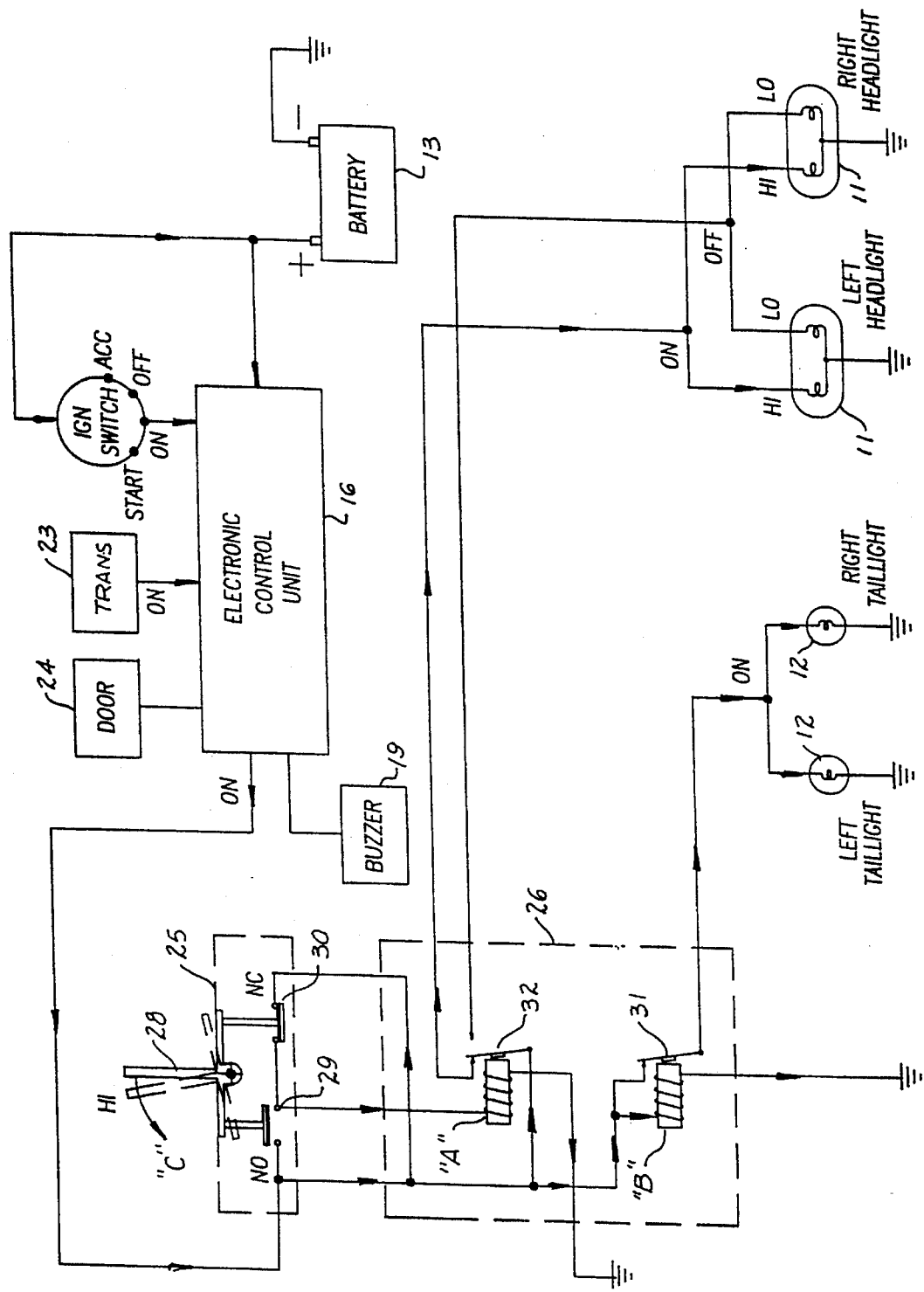
FIG. 8 is a diagram of the high beam reset portion of the motor vehicle headlight system of FIG. 1 with headlight low beams active.
Figure 9:
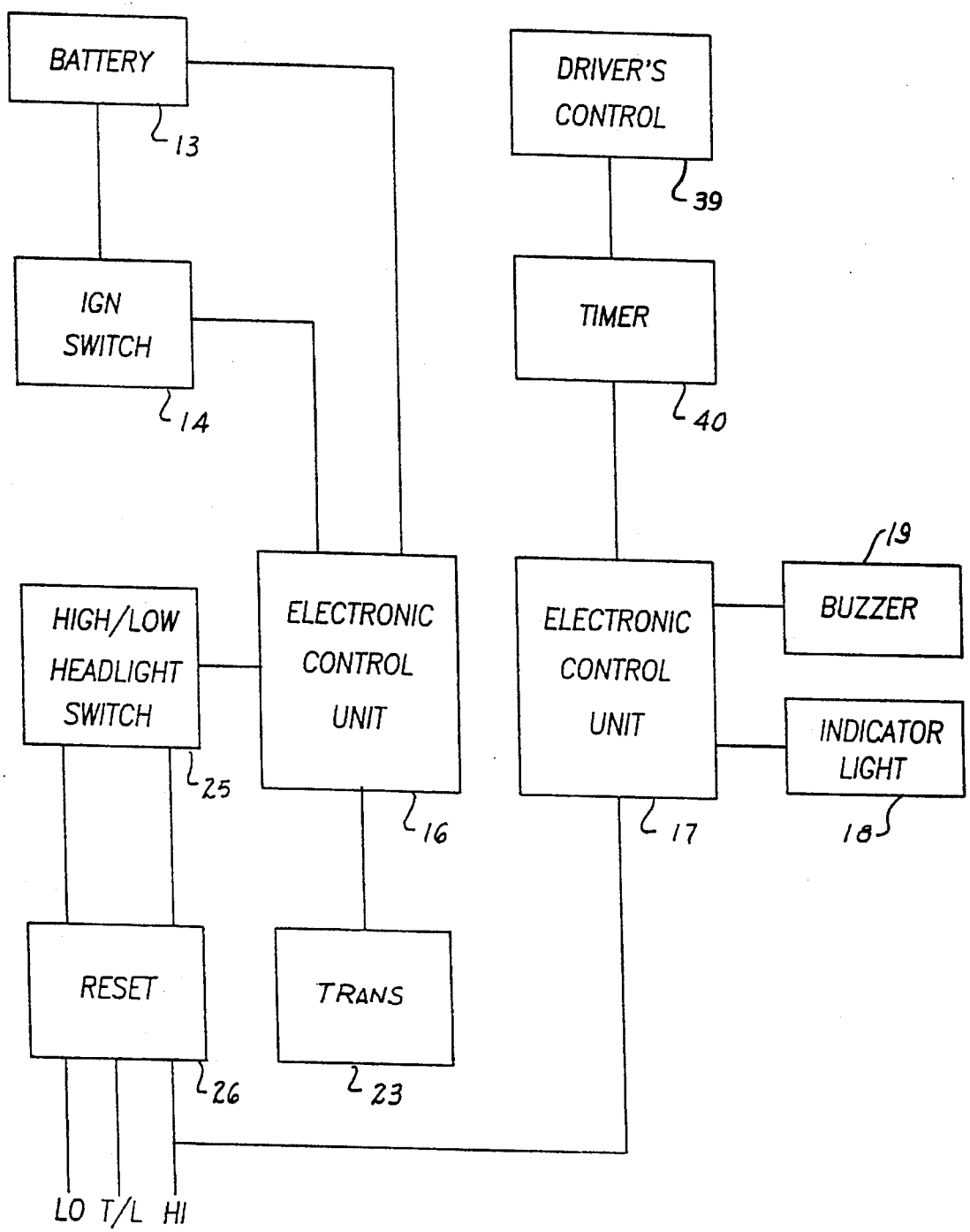
FIG. 9 is a diagram similar to FIG. 8 with the headlight high beams active.

Referring now to FIGS. 8 and 9, a relay reset circuit 26 is shown for automatically resetting the headlights 11 from high beam to low beam when a driver leaves his vehicle. The reset circuit 26 is comprised of the HI/LO switch 25 and an electromagnetic relay 27. The HI/LO switch 25 has an actuator arm 28, a set of momentary normally open (NO) contacts 29 and a set of normally closed (NC) contacts 30.

The relay has two coils. Coil "A" resets the headlights 11 from high beam to low beam and coil "B" operates the taillights 12 when the headlights 11 are in high beam or low beam. In FIG. 8, the reset circuit 26 is shown with the headlights 11 operating in low beam. The vehicle is in motion, the ignition switch 14 is at the "on" position and current is supplied via the ECU 16 and HI/LO switch 25 to relay coil "B" to close a pair of SPST relay contacts 31 and turn on the taillights 12. Current is also supplied via the ECU 16, the HI/LO switch 25, and SPDT relay contacts 32 to turn on the headlight 11 low beams.

In FIG. 9, the reset circuit 26 is shown with the headlights 11 operating in high beam. The vehicle is in motion, the ignition switch 14 is at the "on" position and current is supplied via the ECU 16 and HI/LO switch 25 to relay coil "B" to close the SPST relay contacts 31 and turn on the taillights 12. The headlights 11 are switched to high beam by rotating actuator arm 28 in the direction of arrow "C" to momentarily close the NO contacts 29. The momentary closing of the NO contacts 29 supplies current to relay coil "A" to switch the SPDT contacts 32 from a low beam position to a high beam position.

When the SPDT contacts 32 switch over to high beams, a circuit is completed through coil "A" and the NC relay contacts 30 to latch the SPDT contacts 32 in the high beam position. With reference to FIG. 8, a momentary rotation of actuator arm 28 of HI/LO switch 25, in the direction of arrow "D," opens the NC contacts 30, thereby unlatching the SPDT relay contacts 32, to switch the headlights 11 to low beam. If the vehicle is stopped, a movement of the ignition switch 14 will also open the latch to switch the headlights 11 from high to low beam.

Figure 10:
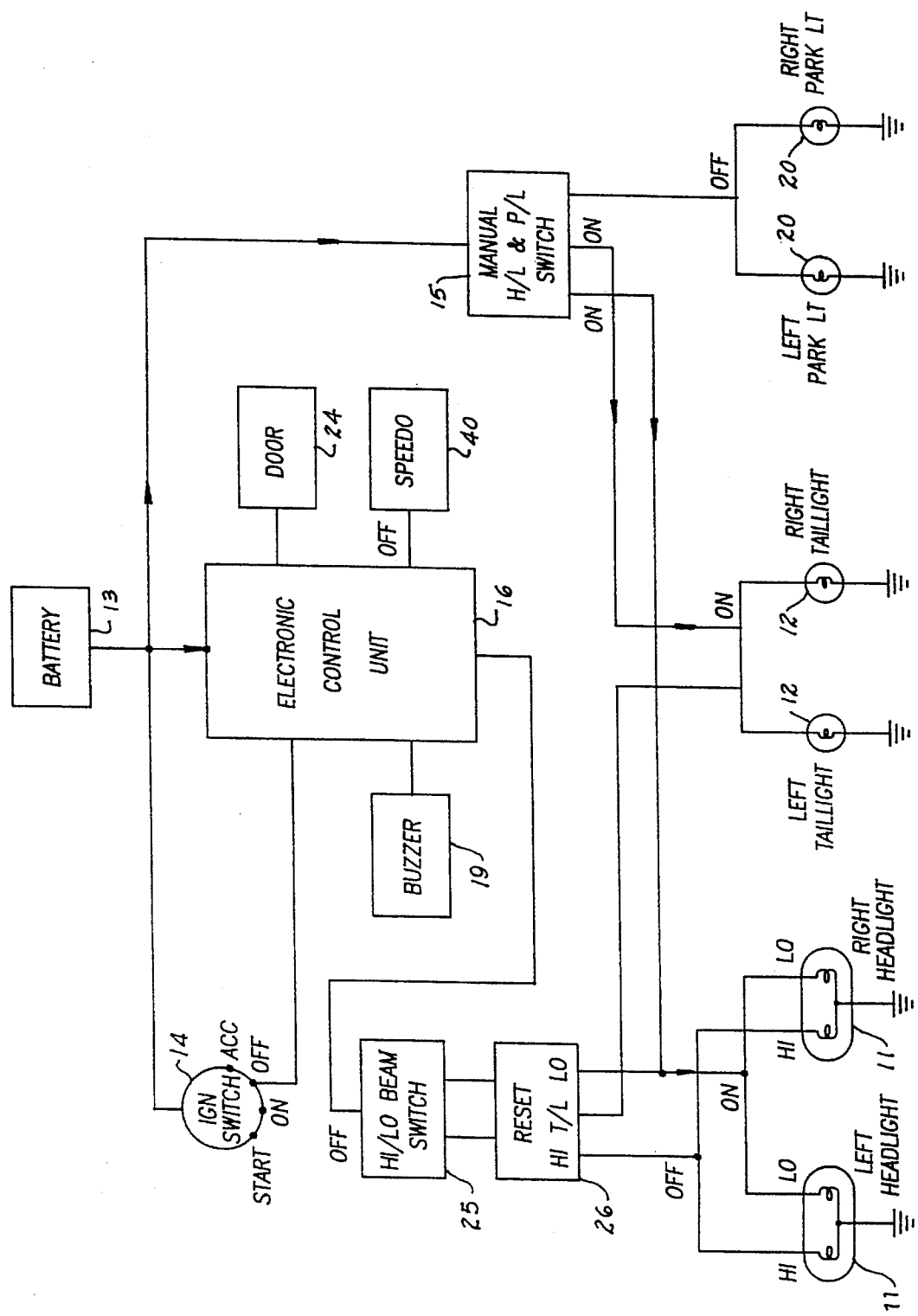
FIG. 10 is a diagram of an alternate embodiment of a motor vehicle headlight sub-system with headlights and taillights turned off according to the present invention.

In FIG. 10, an embodiment is shown wherein the transmission switch 23 has been replaced by an electric speedometer (speedo) circuit 40 to sense when the vehicle is set in motion. In this embodiment, the headlights 11 and taillights 12 are turned on when the vehicle is set in motion. The manual headlight/taillight switch 15 is connected to the vehicle battery 13, thereby allowing the headlights 11 and taillights 12 to be activated when the vehicle is at rest and the ignition switch 14 is at the "off" position.

When the ignition switch 14 is at the "on" position and the vehicle is set in motion, voltages are applied by the ignition switch 14 and speedometer circuit to ECU 16 to activate the headlights 11 and taillights 12.

From the foregoing it will be appreciated that my vehicle satisfies the needs of current and future vehicle lighting systems and provides benefits heretofore unavailable. The invention promotes a smooth flow of traffic, improves vehicle safety, and reduces driver annoyance caused by the excessive use of bright headlights, turn signals and emergency signals.

Although but two embodiments have been illustrated and described, it is not my intention to limit my invention in this manner since other embodiments can be derived by changes in material, shape, substitutions and re-arrangements of parts without departing from the spirit thereof.

I claim:

1. In a motor vehicle of the type having a battery, a transmission having a neutral position, a forward position and a rearward position; an ignition switch having an "on" and an "off" position, a pair of headlights for projecting a pair of high beams and for projecting a pair of low beams; a pair of taillights, turn signal lights, parking lights, and emergency signal lights, the improvement comprising: a means for automatically activating said headlights and said taillights when said ignition switch is at said "on" position and said transmission is in said forward or said rearward position; a means for automatically de-activating said headlights and said taillights when said transmission is in said neutral position and said ignition switch is moved from said "on" position to said "off" position; and a means for automatically resetting said headlights from said high beams to said low beams when said ignition switch is moved from said "on" position to said "off" position.

2. The improvement recited in claim 1 wherein said transmission further has a "park" position and said means for automatically de-activating said headlights and said taillights is further operable when said transmission is in "park" position.

3. The improvement recited in claim 1 further comprising a switch for manually activating said taillights and headlights or parking lights when said ignition switch is at said "off" position.

4. The improvement recited in claim 1 further comprising a means for preventing a driver from deactivating said headlights when said vehicle is in motion.

5. The improvement recited in claim 1 wherein said illuminated means for reminding said driver comprises a flashing illuminated message center for displaying indicia.

6. The improvement recited in claim 1 wherein said means for automatically activating said headlights when said transmission is in said forward or rearward position and for automatically de-activating said headlights when said ignition switch is moved from an "on" position to an "off" position is comprised of a switch which is responsive to said forward and rearward positions of said transmission; and an electronic control unit for receiving signals from said ignition switch and said transmission position responsive switch.

7. The improvement recited in claim 1 further comprising a switch for manually activating said taillights and headlights or parking lights when said vehicle is not in motion and said ignition switch is at said "on" position.

8. The improvement recited in claim 5 wherein said means for automatically resetting said headlights from said high beams to said low beams when said ignition switch is moved from said "on" position to said "off" position comprises a HI/LOW switch having a normally open set of contacts and a set of normally closed contacts; a relay having a set of SPDT contacts, said SPDT contacts having a closed position for activating said headlight low beams and a closed position for activating said headlight high beams, said SPDT relay contacts becoming latched in said high beam position when said normally open contacts of said HI/LO switch are momentarily closed to activate said high beams and being unlatched when said normally closed set of said HI/LO switch are momentarily opened to activate said low beams.

9. In a motor vehicle of the type having a battery, a transmission having a neutral position, a forward position and a rearward position; an ignition switch having an "on" and an "off" position, a pair of headlights for projecting a pair of high beams and for projecting a pair of low beams; a pair of taillights, turn signal lights, parking lights, and emergency signal lights, the improvement comprising: a means for automatically activating said headlights and said taillights when said ignition switch is at said "on" position and said transmission is in said forward or said rearward position; and a means for automatically resetting said headlights from said high beams to said low beams and de-activating said headlights and said taillights when said transmission is in said neutral position and said ignition switch is moved from said "on" position to said "off" position.

10. In a motor vehicle of the type having a battery, a transmission having a neutral position, a forward position and a rearward position; an ignition switch having an "on" and an "off" position, a pair of headlights for projecting a pair of high beams and for projecting a pair of low beams; a pair of taillights, turn signal lights, parking lights, and emergency signal lights, the improvement comprising: a means for automatically activating said headlights and said taillights when said ignition switch is at said "on" position and said transmission is in said forward or said rearward position; a means for automatically de-activating said headlights and said taillights when said transmission is in said neutral position and said ignition switch is moved from said "on" position to said "off" position; and an automatic means for reminding a driver that his vehicle's emergency signals are turned on, said means comprising: an indicator light mounted in the interior of a vehicle in view of said driver; an audio generator for producing an audible signal; and an electronic control unit for automatically activating said indicator light and said audio generator when said vehicle's emergency signals are turned on; and a timer for delaying the activation of said indicator light and said audio generator.

11. In a motor vehicle of the type having a battery, a transmission having a neutral position, a forward position and a rearward position; an ignition switch having an "on" and an "off" position, a pair of headlights for projecting a pair of high beams and for projecting a pair of low beams; a pair of taillights, turn signal lights, parking lights, and emergency signal lights, the improvement comprising: a means for automatically activating said headlights and said taillights when said ignition switch is at said "on" position and said transmission is in said forward or said rearward position; a means for automatically de-activating said headlights and said taillights when said transmission is in said neutral position and said ignition switch is moved from said "on" position to said "off" position; and a means for automatically informing a driver said high beams or said turn signals or said emergency signals are turned on, said means including a timer for delaying when said driver is informed.

12. In a motor vehicle of the type having a battery, a transmission having a neutral position, a forward position and a rearward position; an ignition switch having an "on" and an "off" position, a pair of headlights for projecting a pair of high beams and for projecting a pair of low beams; a pair of taillights, turn signal lights, parking lights, and emergency signal lights, the improvement comprising: an automatic means for reminding a driver of said vehicle that his vehicle's headlight high beams are turned on, said means comprising: a flashing illuminated means in the interior of a vehicle in view of said driver and an audible means in said interior; an electronic means for automatically activating said indicator light and said audio generator when said vehicle's headlight high beams are turned on; and a timer for delaying the activation of said indicator light and said audio generator.

13. The improvement recited in claim 12 further comprising a control for manually adjusting said delay of said illuminated means and said audible means.

14. In a motor vehicle of the type having a battery, an ignition switch having an "on" and an "off" position, a pair of headlights for projecting a pair of high beams and for projecting a pair of low beams; a pair of taillights, turn signal lights, parking lights, and emergency signal lights, the improvement comprising: an electronic control unit for automatically de-activating said headlights, re-setting said high beams to said low beams and de-activating said taillights when said vehicle is at rest and said ignition switch is at said "off" position and for automatically activating said headlights when said vehicle is in motion and said ignition switch is at said "on" position; a means for sensing when said vehicle is in motion to activate said headlights, said means for sensing when said vehicle is in motion also preventing a driver from turning off said headlights when said vehicle is in motion.

15. The improvement recited in claim 14 wherein said vehicle speed sensing means to activate said headlights and preventing said driver from turning off said headlights is an electric speedometer.

16. In a motor vehicle of the type having a battery, an ignition switch having an "on" and an "off" position, a pair of headlights for projecting a pair of high beams and for projecting a pair of low beams; a pair of taillights, turn signal lights, parking lights, and emergency signal lights, the improvement comprising: an electronic control unit, said control unit having two operating states, a first state for automatically de-activating said headlights and said taillights and automatically re-setting said high beams to said low beams when said vehicle is stopped and said ignition switch is moved to said "off" position and for automatically activating said headlights when said vehicle is set in motion and said ignition switch is moved to said "on" position, and for preventing a driver from turning off said headlights when said vehicle is in motion; and a second state for overriding said electronic control unit comprising a switch for manually operating said headlights and said taillights when said vehicle is at rest.

17. In a motor vehicle of the type having a battery, an ignition switch having an "on" and an "off" position, a pair of headlights for projecting a pair of high beams and for projecting a pair of low beams; a pair of taillights, turn signal lights, parking lights, and emergency signal lights, the improvement comprising: a means for automatically resetting said headlights from said high beams to said low beams when said vehicle is stopped and said ignition switch is moved from said "on" position to said "off" position.

18. In a motor vehicle of the type having a battery, an ignition switch having an "on" and an "off" position, a pair of headlights for projecting a pair of high beams and for projecting a pair of low beams; a pair of taillights, turn signal lights, parking lights, and emergency signal lights, the combination comprising: a means for automatically activating said headlights and said taillights when said ignition is at said "on" position and said vehicle is initially set in motion; a means for automatically de-activating said headlights and said taillights when said vehicle is stopped and said ignition switch is moved from said "on" position to said "off" position; and a means for automatically resetting said headlights from high beams to low beams when said vehicle is stopped and said ignition switch is moved from said "on" position to said "off" position.

19. A motor vehicle comprising: an ignition switch having an "on" and an "off" position; a pair of headlights for projecting a pair of high beams and for projecting a pair of low beams; a pair of taillights: a means for controlling said headlights, said means comprising a switch for manually activating said headlight high beams and said headlight low beams, and a reset device for automatically resetting said headlight from said high beams to said low beams when said ignition switch is moved from said "on" position to said "off" position.

20. The motor vehicle recited in claim 19 further comprising a switch for manually activating said headlights and said taillights; a means for automatically activating said headlights and said taillights when said ignition switch is at said "on" position and said vehicle is set in motion; and an audible means for reminding a driver that said high beams have been activated, said means including a timer which is selectably adjustable by said driver for delaying an activation of said audible means.

* * * * *